(12) United States Patent
Hasegawa et al.

(10) Patent No.: US 10,564,907 B2
(45) Date of Patent: Feb. 18, 2020

(54) IMAGE FORMING APPARATUS, DISPLAY CONTROL METHOD, AND STORAGE MEDIUM

(71) Applicant: CANON KABUSHIKI KAISHA, Tokyo (JP)

(72) Inventors: Yuya Hasegawa, Abiko (JP); Takayuki Iikura, Tokyo (JP); Shinya Ikeda, Toride (JP); Satoru Ikeda, Kashiwa (JP); Toru Ikeda, Abiko (JP); Tomoya Sato, Kawasaki (JP); Kanta Kumagai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/115,236

(22) Filed: Aug. 28, 2018

(65) Prior Publication Data
US 2019/0073172 A1  Mar. 7, 2019

(30) Foreign Application Priority Data

Sep. 5, 2017  (JP) .................................. 2017-170048

(51) Int. Cl.
*G06F 3/12* (2006.01)
*H04N 1/00* (2006.01)

(52) U.S. Cl.
CPC .......... *G06F 3/1256* (2013.01); *G06F 3/1204* (2013.01); *H04N 1/00413* (2013.01);
(Continued)

(58) Field of Classification Search
CPC ........... H04N 1/00413; H04N 1/00482; H04N 1/00572; H04N 1/00506
(Continued)

(56) References Cited

U.S. PATENT DOCUMENTS

2009/0323136 A1* 12/2009 Fujiwara ............ G03G 15/5025
358/474
2011/0292464 A1* 12/2011 Shih ................... H04N 1/00713
358/474

(Continued)

FOREIGN PATENT DOCUMENTS

JP   2001-346009 A   12/2001
JP   2010-128274 A    6/2010

*Primary Examiner* — Miya J Williams
(74) *Attorney, Agent, or Firm* — Canon U.S.A., Inc. IP Division

(57) ABSTRACT

A display control method for an image forming apparatus includes detecting that a document is placed on a document reading unit, determining, when it is detected that the document is placed on the document reading unit, whether the size of the document is a predetermined size, displaying a first function screen on a display when a first function capable of performing one of a plurality of functions accompanying a reading operation for a document placed on the document reading unit is performed, and displaying a second function screen to which a screen is switched from the first function screen and that is displayed when a second function created by modifying the first function based on a specific setting is performed, in a case where, while the first function screen is displayed, it is determined that the size of the detected document is not the predetermined size.

7 Claims, 6 Drawing Sheets

(52) U.S. Cl.
CPC ..... *H04N 1/00482* (2013.01); *H04N 1/00506* (2013.01); *H04N 1/00572* (2013.01)

(58) Field of Classification Search
USPC .......................................................... 358/1.2
See application file for complete search history.

(56) References Cited

U.S. PATENT DOCUMENTS

2012/0081759 A1\* 4/2012 Itoh .................... H04N 1/00588
358/449
2016/0295051 A1\* 10/2016 Dandoko ........... H04N 1/00822

\* cited by examiner

IMAGE FORMING APPARATUS, DISPLAY CONTROL METHOD, AND STORAGE MEDIUM

BACKGROUND

Field

The present disclosure relates to an image forming apparatus for display control of a display, a display control method, and a storage medium.

Description of the Related Art

An image forming apparatus, such as a multifunction device, is used for, for example, making a copy of an original document having a standard size, such as A4, B4, or B5, onto a sheet of paper having the standard size. The image forming apparatus is also used for a special purpose, such as copying a document with a non-standard size smaller than the standard size, for example, an identification card, in a layout where the front face and the back face of the document are printed on the same face of a sheet of printing paper. To implement such a special use, the paper size for print, the aggregation mode for scanned documents, and the like need to be set up. As a result, when a user needs to perform this operation many times, the workload of the user increases. In this respect, the image forming apparatus described in Japanese Patent Laid-Open No. 2010-128274 does not require the resetting operation to be performed when repeatedly printing a document with a non-standard size, and this is achieved by preconfiguring in advance the settings of the document size and the aggregation mode for the non-standard-size document.

Using the image reading apparatus described in Japanese Patent Laid-Open No. 2001-346009, an example of means for specifying the size of a document placed on a document table is disclosed. In the main scanning direction, the size of a document is detected by a charge-coupled device (CCD) sensor that senses the edge of the document before the start of the document reading operation. In the sub scanning direction, the size of the document is detected by a sensor for detecting the size of a document that detects the reflection of light from the document. The image reading apparatus detects the size of a document in accordance with these two detection results.

When an aggregated copy of documents with a registered non-standard size is repeatedly produced by using the technology described in Japanese Patent Laid-Open No. 2010-128274, operations of selecting a copy menu on a home screen, loading registered settings, placing a document, and copying are repeatedly performed. The setting registration operation during the aforementioned operations may be performed by an operator other than the designer of the image forming apparatus or a user. Hence, if the user does not know the registered settings, the user cannot make use of the registered settings. If it is assumed that a user who knows the registered settings repeatedly performs copying, the registered settings need to be loaded whenever copying is performed, resulting in an increase of the workload.

SUMMARY

The present disclosure provides an image forming apparatus including a document reading unit, a display, a detection unit configured to detect that a document is placed on the document reading unit, a determination unit configured to determine, when it is detected that the document is placed on the document reading unit, whether the size of the document is a predetermined size, a first display unit configured to display a first function screen on the display when a first function capable of performing one of a plurality of functions accompanying a reading operation for a document placed on the document reading unit is performed, and a second display unit configured to display a second function screen to which the screen is switched from the first function screen displayed on the display and that is displayed when a second function created by modifying the first function based on a specific setting is performed, in a case where, while the first function screen is displayed, it is determined that the size of the detected document is not the predetermined size.

Further features will become apparent from the following description of exemplary embodiments with reference to the attached drawings.

DESCRIPTION OF THE EMBODIMENTS

Figure 1:
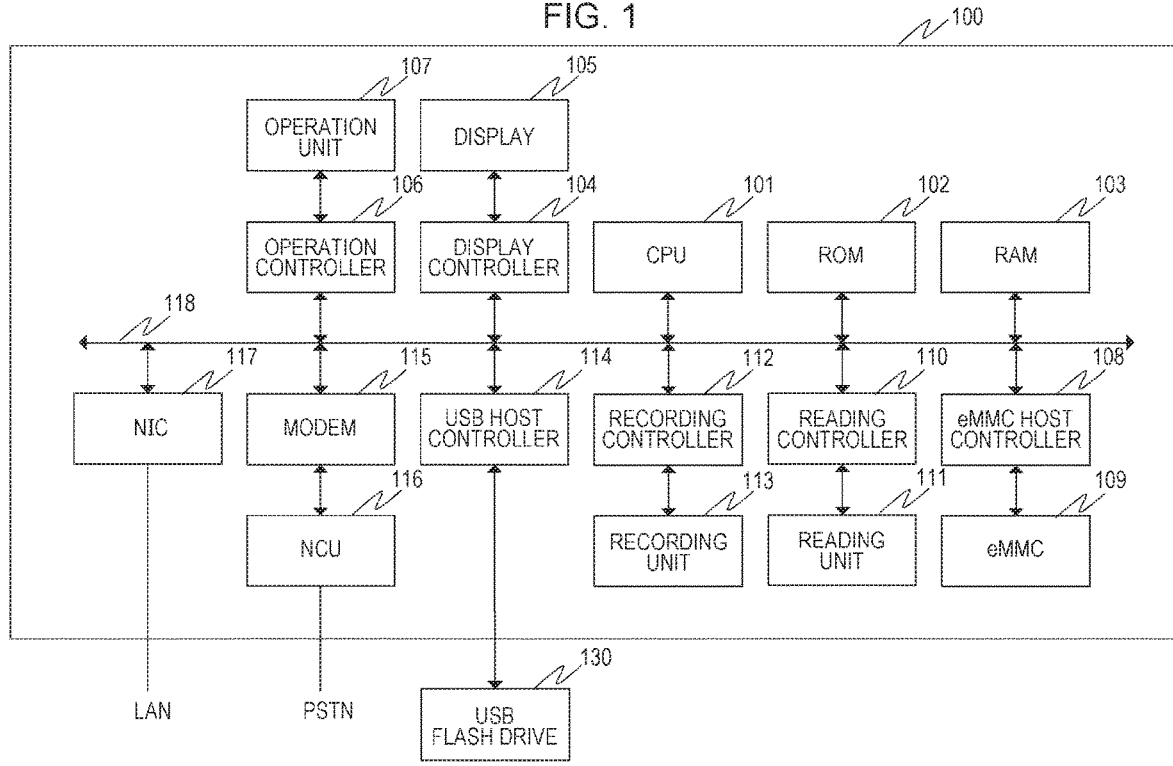
FIG. 1 is a block diagram illustrating an example of a hardware configuration of an image forming apparatus according to an embodiment.

Hereinafter, embodiments will be described with reference to the drawings. FIG. 1 is a block diagram illustrating an example of a hardware configuration of an image forming apparatus 100 according to an embodiment. The image forming apparatus 100 includes, for example, a central processing unit (CPU) 101, a read-only memory (ROM) 102, a random access memory (RAM) 103, a display controller 104, a display 105, an operation controller 106, an operation unit 107, a reading controller 110, a reading unit 111, a recording controller 112, and a recording unit 113. The image forming apparatus 100 includes, for example, a Universal Serial Bus (USB) host controller 114, a modem 115, a network control unit (hereinafter referred to as an NCU) 116, and a network interface card (hereinafter referred to as an NIC) 117. The image forming apparatus 100 includes, for example, an embedded multi-media card (eMMC) host controller 108 and an eMMC 109.

The CPU 101 performs overall control for components of the image forming apparatus 100 via a system bus 118. When power is supplied, the CPU 101 executes a boot program stored on the ROM 102. The boot program usually loads in the RAM 103 a main program stored in the eMMC 109 as a storage device and jumps to the beginning of the loaded main program. The RAM 103 functions as the loading area for the main program and also functions as, for example, the work area for the main program.

The display controller 104 controls displaying on the display 105. The display 105 can be, for example, a liquid crystal display (LCD) that displays text, a ruled line, a scroll bar, and the like. The operation controller 106 controls input entered via the operation unit 107 provided in the image forming apparatus 100. The operation unit 107 includes, for example, a touch panel, a numeric keypad, arrow keys, and a one-touch key.

The reading unit 111 as a document reading unit, includes, for example, a CCD sensor and a document-size detection sensor using a reflective sensor, detects the size of a document to be read and optically reads information shown on the document. The reading unit 111 has two places for placing a document: a document table for reading documents one by one and an automatic document feeder for automatically reading multiple documents. Placement of a document can be detected in both places.

The reading unit 111 is connected to the reading controller 110. The CPU 101 transmits and receives information to and from the reading unit 111 while the reading unit 111 is controlled by the reading controller 110. The recording unit 113, for example, forms an image on recording paper (a sheet) by employing an electrophotographic method. The recording unit 113 is connected to the recording controller 112. The CPU 101 transmits and receives information to and from the recording unit 113 while the recording unit 113 is controlled by the recording controller 112.

The USB host controller 114 controls the USB protocol and mediates access to a USB device such as a USB flash drive 130. The modem 115 performs signal modulation and demodulation necessary for facsimile communication. The modem 115 is connected to the NCU 116. A signal modulated by the modem 115 is transmitted to the public switched telephone network (PSTN) via the NCU 116. The NIC 117 transmits and receives data to and from servers for email and files via a local area network (LAN). The CPU 101 accesses the eMMC 109 via the eMMC host controller 108.

Figure 2:
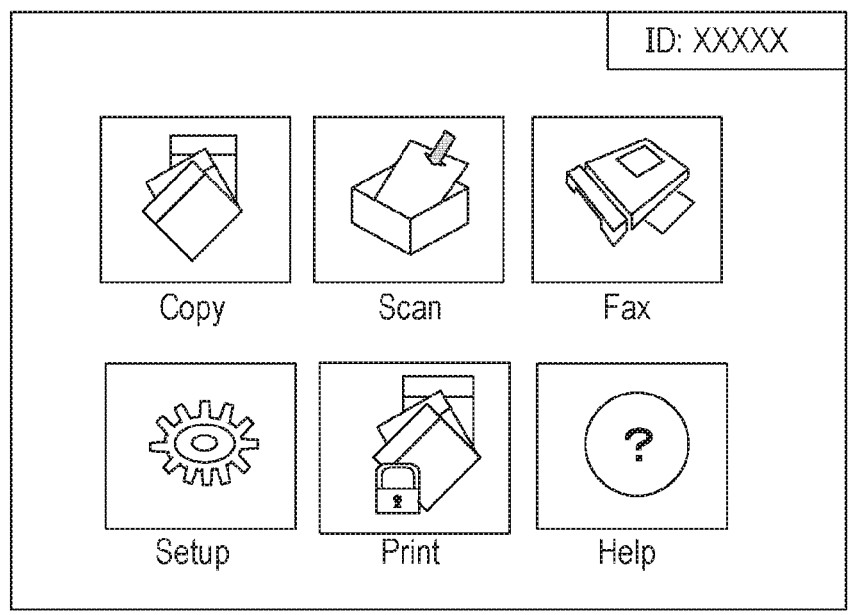
FIG. 2 illustrates an example of a home screen according to the embodiment.

Next, examples of function screens displayed on the display 105 are described with reference to FIGS. 2 to 4C. FIG. 2 illustrates an example of a home screen. Buttons for accessing various function screens of the image forming apparatus 100 are displayed on the home screen. The various function screens are for functions accompanying image reading such as scanning, copying, facsimile, and the like, functions accompanying image reading such as printing, functions accompanying neither image reading nor image forming such as settings and help, and the like. The screen illustrated in FIG. 2 is the representative home screen, which can be changed to a copy screen illustrated in FIG. 3A by pressing the copy button on the screen.

Figure 3A:
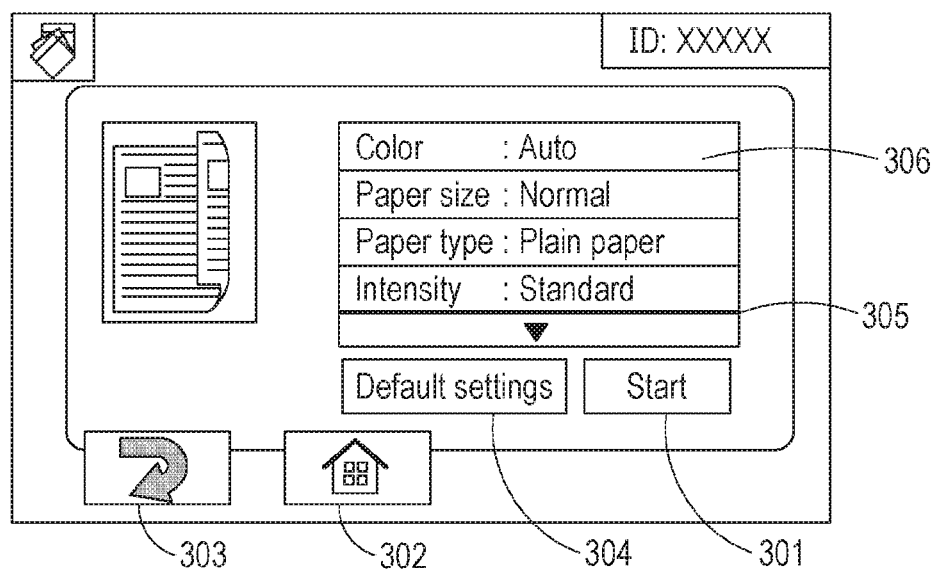
FIGS. 3A to 3C illustrate examples of a copy screen according to the embodiment.
Figure 3B:
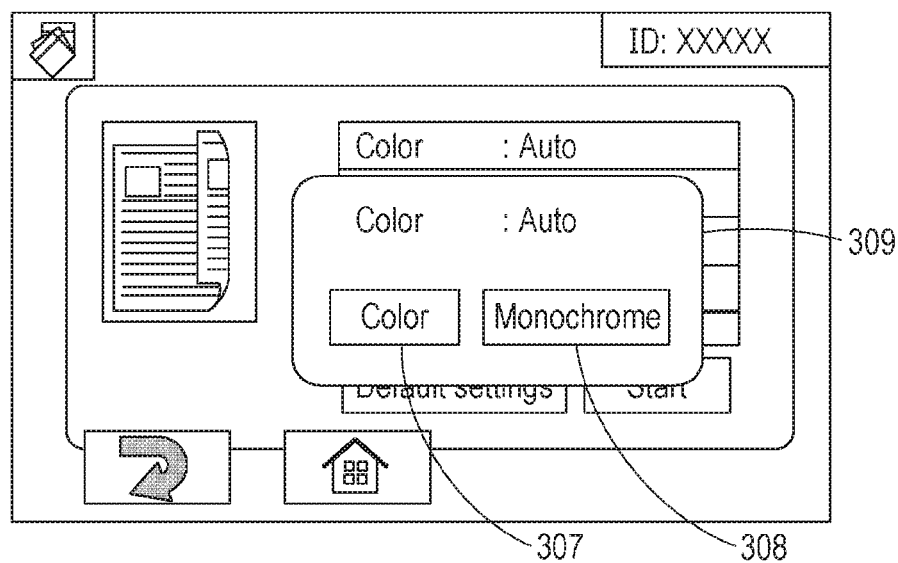

FIG. 3A illustrates an example of the copy screen. Various settings such as color/monochrome printing, paper size, and paper type can be set on the copy screen, and, in addition, copying can be performed by pressing a start button 301 on the copy screen. When returning to the home screen, a home button 302 or a back button 303 is pressed. When reverting various settings for the copy operation to preset default settings, a default settings button 304 is pressed and the various settings are reverted to the preset default settings. When configuring settings, buttons corresponding to various settings to be set are displayed on a scrolling window 305 of the copy screen and pressed.

For example, when color copying or monochrome copying is manually configured, a color selection button 306 on the scrolling window 305 is pressed. By pressing the color selection button 306, the screen changes to the copy screen illustrated in FIG. 3B in which an expanded screen 309 with a color button 307 and a monochrome button 308 is added. For example, by pressing the color button 307 on the screen illustrated in FIG. 3B, the screen is changed to the screen illustrated in FIG. 3C and the setting for color/monochrome displayed on the scrolling window 310 is changed from "Auto" of the default setting to "Color". Other settings such as the paper size and the paper type are configured in the same manner.

Figure 3C:
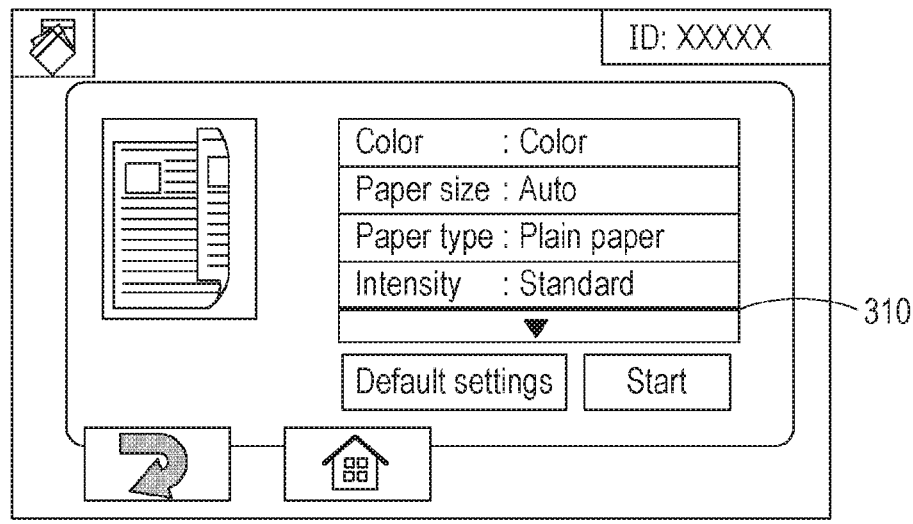
Figure 4A:
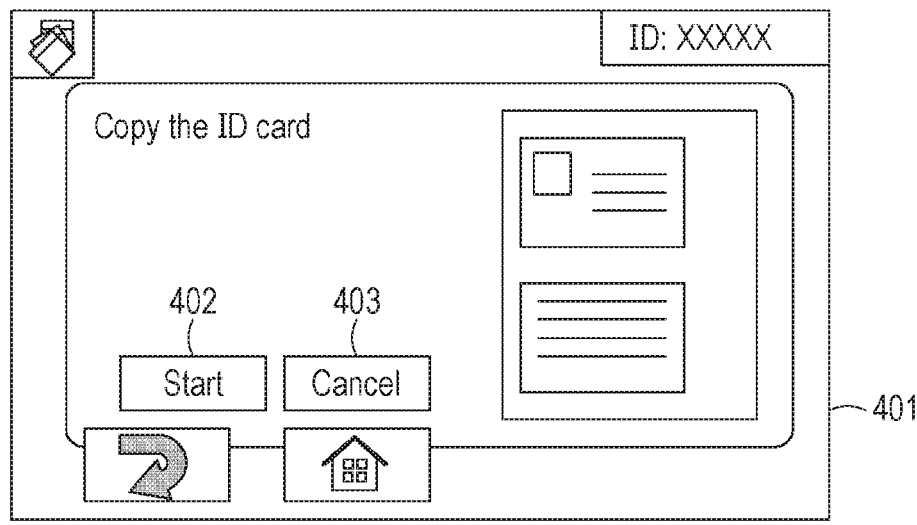
FIGS. 4A to 4C illustrate examples of a copy-execution check screen for identification card according to the embodiment, in a case where a non-standard-size document is detected.

FIG. 4A illustrates a copy-execution check screen for a non-standard-size document that is displayed instead of the copy screen when the reading unit 111 detects, while the copy screen is displayed, a non-standard-size document, such as an identification card or a driver's license card, which is smaller than a typical standard size. In this embodiment, it is assumed that the copy-execution check screen for a non-standard-size document is automatically displayed in the case where a non-standard-size document is detected on the document table. As an example of the copy-execution check screen for a non-standard-size document, a copy-execution check screen for identification card, which is a function screen providing guidance for reading the first face of a document, is described here. A copy-execution check screen for identification card illustrated in FIG. 4A includes an identification-card copy-instruction screen 401, a start button 402 for starting copying of an identification card, and a cancel button 403 as an operation button for returning to the copy screen illustrated in, for example, FIG. 3C. By pressing the start button 402, various settings for copy operation are changed to the settings for copying an identification card, and the reading unit 111 starts reading the first face of a document.

Figure 6A:
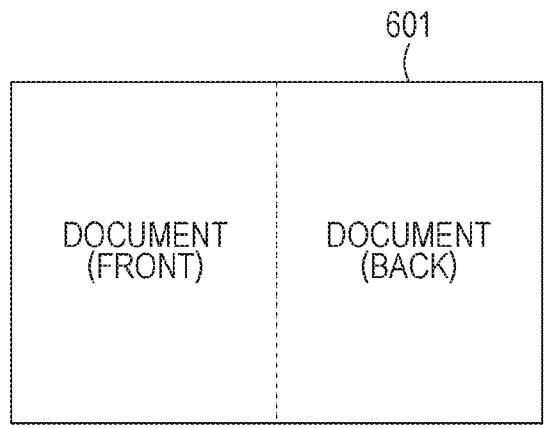
FIGS. 6A and 6B illustrate examples of an aggregation mode for copying an identification card.
Figure 6B:
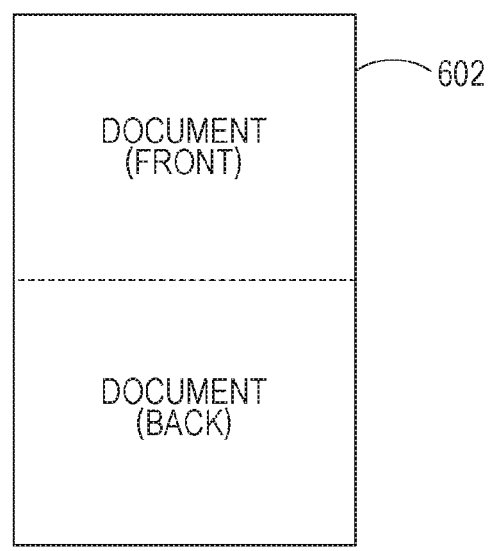

The settings for copying an identification card are, for example, configured such that the paper size is A4, the paper type is plain paper, and the printing mode is aggregation mode (2 in 1), in which images of both faces (two faces) of a document are aggregated on the same side (one side) of a sheet of printing paper. In addition, the setting for color/monochrome printing can be included. These kinds of setting information parameters are preset in, for example, a memory unit such as the RAM 103, and are automatically read when copying of an identification card is performed by using the copy-execution check screen for identification card. Copying is performed according to the settings. Among these default settings, the paper size and the like, for example, can be changed by an operator or the like. The 2-in-1 aggregation mode also includes, for example, the layout in which images of the front face and the back face are aligned in the direction of the landscape orientation of printing paper 601 and printed as illustrated in FIG. 6A and the layout in which images of the front face and the back face are in the direction of the portrait orientation of printing paper 602 and printed as illustrated in FIG. 6B. One of these layouts can be selected in advance as a preset.

Among the above-described kinds of setting information parameters, for example, one or more of the paper size, the paper type, or color/monochrome printing can be configured by using the copy screen illustrated in FIG. 3A. In such a case, if a non-standard-size document is detected, the copy screen is changed to the copy-execution check screen for an identification card after these settings are configured by using the copy screen.

The copy-execution check for identification card is canceled by pressing the cancel button 403 on the copy-execution check screen for the identification card, and the copy screen illustrated in FIG. 3C is displayed. In this embodiment, various settings for copy operation that have been configured before displaying the copy-execution check screen for identification card are maintained, but various settings for copy operation may be changed to default settings. In this case, when the cancel button 403 is pressed, the screen is changed to the screen illustrated in FIG. 3A instead of the screen illustrated in FIG. 3C.

Figure 4B:
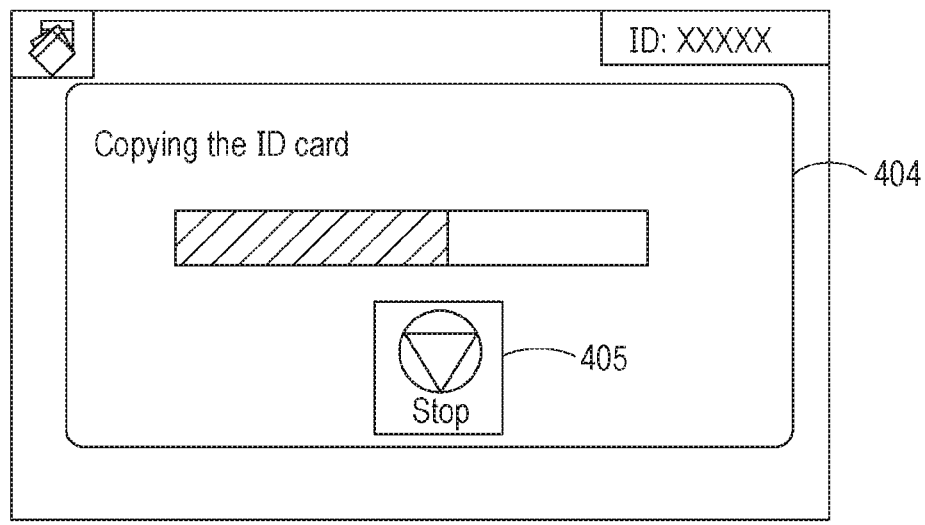

While the reading unit 111 reads the first face of a document, the copy-state indication screen for identification card 404 illustrated in FIG. 4B is displayed on the display 105. A stop button 405 is disposed on the copy-state indication screen for identification card 404, and pressing the stop button 405 cancels copying of an identification card. When copying of an identification card is canceled, similarly to the case of pressing the cancel button 403, the screen is changed to the copy screen illustrated in FIG. 3C, where various settings for copy operation have been configured.

Figure 4C:
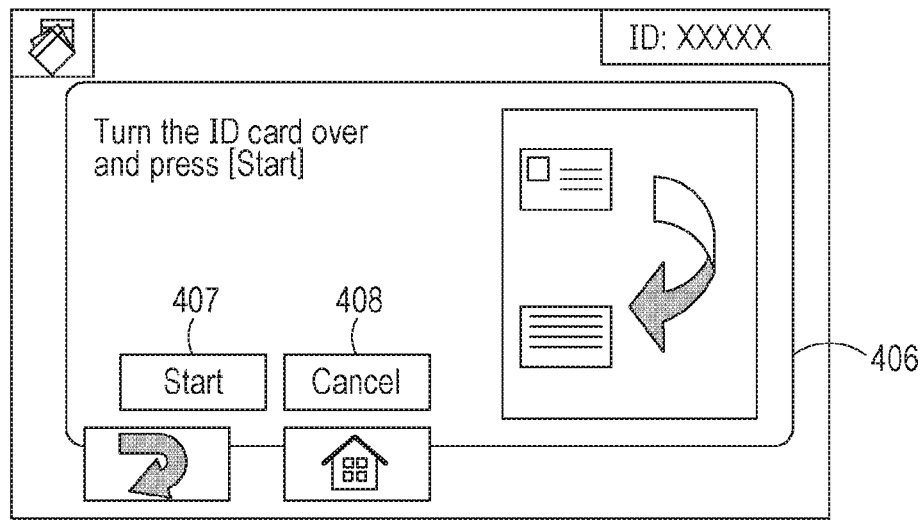

After the reading unit 111 completes reading of the first face of the document, the screen is changed to the copy-continuation confirmation screen for identification card 406 illustrated in FIG. 4C, which is a function screen for providing guidance for reading of the second face of an identification card. The copy-continuation confirmation screen for identification card 406 includes a start button 407 for instructing execution of reading of the second face of an identification card and a cancel button 408 as an operation button. After the copy-continuation confirmation screen for identification card 406 is displayed, the user changes the side of the document to be placed on the document table of the reading unit 111 to the second face and presses the start button 407. By pressing the start button 407, the reading unit 111 starts reading the second face of the document. In a case where the cancel button 408 is pressed, similarly to the case of pressing the stop button 405, the execution of copying of the identification card is canceled and the screen is changed to the copy screen illustrated in FIG. 3C, where various settings for copy operation have been configured. While reading the second face, the copy-state indication screen for identification card 404 illustrated in FIG. 4B is displayed. After the reading is completed, an image formed in accordance with the various settings for copy operation is output by the recording unit 113.

Figure 5:
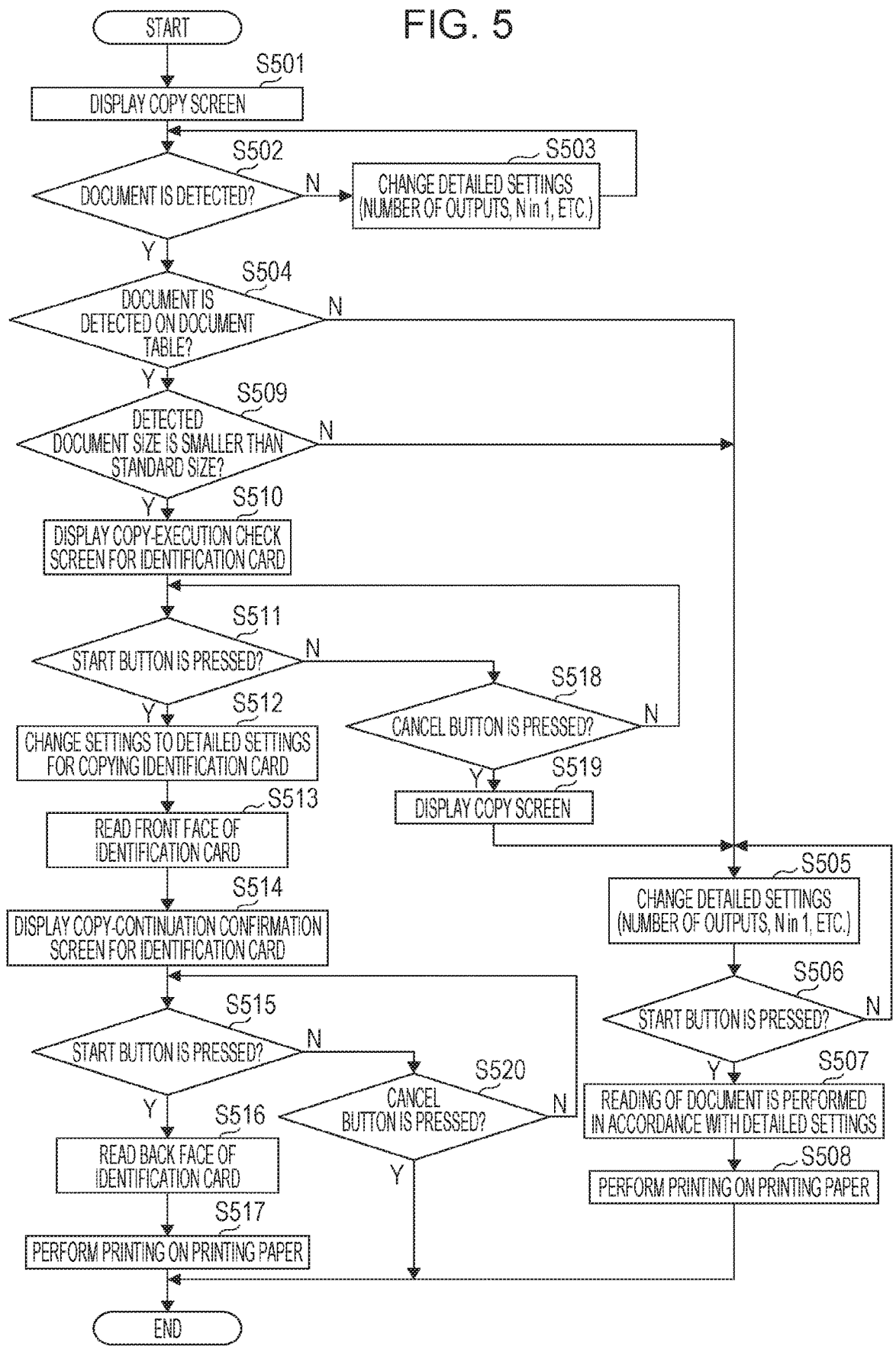
FIG. 5 is a flowchart illustrating an example of an operation for copying an identification card according to the embodiment.

FIG. 5 is a flowchart illustrating an example of an operation performed by the image forming apparatus 100 of this embodiment for copying an identification card as an example of a non-standard-size document smaller than a typical standard-size document. The program that runs on the image forming apparatus 100 following the flowchart illustrated in FIG. 5 is, for example, stored on a storage device, loaded into the RAM 103 and then executed by the CPU 101. In the following description, the character "S" indicates a step.

In the flowchart in FIG. 5, the processing flow starts when the home screen is changed to the copy screen. First, in 501, the copy screen is displayed. In S502, it is determined whether the reading unit 111 detects a document. In a case where no document is detected, the processing flow proceeds to S503 and various settings for copy operation are changed by receiving an instruction via the scrolling window 305. Examples of changing settings include the change of the number of items to be output and the change of the aggregation mode (N in 1:N pieces of images are aggregated on the same side (one side)). In a case where it is determined in S502 that the reading unit 111 detects a document, the processing flow proceeds to S504 and it is determined whether the document is detected on the document table. In a case where the document is detected not on the document table but on the automatic document feeder, the processing flow proceeds to S505.

In S505, the various settings for copy operation can be changed by receiving an instruction via the scrolling window 305 as in S503, and the setting change can be accepted until the start button 301 is pressed in S506. In a case where the start button 301 is pressed in S506, reading of the document is performed in accordance with the various changed settings for copy operation (S507). Subsequently, the output according to the result of reading and the various changed settings for copy operation is printed on printing paper (S508).

In a case where it is determined in S504 that the document is detected on the document table, the processing flow proceeds to S509 and it is determined whether the detected document size is a standard size or smaller than a standard size. In a case where the detected document size is a standard size, the processing flow proceeds to S505. In a case where the detected document size is a non-standard size that is smaller than a typical standard size, the copy-execution check screen for identification card illustrated in FIG. 4A is displayed in S510. In S511, it is determined whether the start button 402 is pressed. In a case where the start button 402 is pressed, the various settings for copy operation are changed to the settings corresponding to the setting information parameters for copying an identification card in S512.

In the setting information parameters, for example, one or more of the paper size, the paper type, or color/monochrome printing can be set up on the copy screen illustrated in FIG. 3A. In this case, when it is determined in S509 that a non-standard-size document is detected, a display for suggesting the setup to the user can appear on the copy screen before the processing flow proceeds to S510, and then, the screen is changed to the copy-execution check screen for identification card after the setup is completed.

Subsequently in S513, the second face (the front face) of the identification card placed on the document table is read. At this time, the copy-state indication screen for identification card 404 illustrated in FIG. 4B is displayed. After the reading is completed, the copy-continuation confirmation screen for identification card 406 illustrated in FIG. 4C is displayed in S514. In a case where the start button 407 is pressed in S515, the processing flow proceeds to S516 and the first face (the back face) of the identification card placed on the document table is read. After the reading is completed, in S517, based on the result of reading and the various changed settings for copy operation, the images of both faces of the document are aggregated and printed on printing paper (see FIGS. 6A and 6B)

In a case where the start button 402 is not pressed in S511 and the cancel button 403 is pressed (S518), the copy operation is suspended and the copy screen illustrated in FIG. 3C is displayed (S519). Likewise, in a case where the start button 407 is not pressed in S515 and the cancel button 408 is pressed (S520), the copy operation is suspended and the copy screen illustrated in FIG. 3C is displayed.

In this embodiment, when a user places a document on the document reading unit, the document size is automatically specified. In a case where it is determined that the document size is not the predetermined size, that is, a non-standard size that is smaller than a typical standard size and that is, for example, the size of an identification card, the size of a driver's license card, or the like, the copy screen (FIGS. 3A to 3C), which is the first function screen displayed when copying a document with the predetermined size, is automatically switched to the second function screen (FIGS. 4A to 4C). Here, the first function screen is the copy screen displayed on the display when performing a first function (a function of copying a standard-size document) of performing one of the functions accompanying the reading operation for a document placed on the document reading unit. In a case where a non-standard-size document is detected while the first function screen is displayed, the first function screen is automatically switched to the copy-execution check screen for a non-standard-size document (FIGS. 4A to 4C) and the copy-execution check screen for a non-standard-size document is displayed on the display unit. The copy-execution check screen for a non-standard-size document is a second function screen that is preconfigured for copying a non-standard-size document. Here, the second function screen is a screen displayed when performing a second function (a function of copying a non-standard-size document) that is created by modifying the first function in accordance with specific settings for copying a non-standard-size document. In this manner, the specific setting operation for copying a non-standard-size document can be omitted, thereby reducing the number of operations necessary to complete the copy operation and improving user convenience.

According to this embodiment, the image forming apparatus, the display control method for the image processing apparatus, and the storage medium are described above. The present disclosure is, however, not limited to the above-described embodiment; in other words, the present disclosure is not limited to the case of using an identification card and a driver's license card as examples of a non-standard-size document that is smaller than the standard size as in the above-described embodiment. For example, setting information parameters can initially be set in, for example, a memory unit such as the RAM 103, so that a document with the passport size is automatically detected and printed on predetermined paper in a predetermined aggregation mode. Multiple types of documents can be automatically detected as non-standard-size documents and multiple kinds of setting information parameters corresponding to the respective multiple types of documents can be initially set in a memory unit, thereby copying documents based on the settings (paper size, aggregation mode, and the like) corresponding to the types of the non-standard-size documents.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-170048 filed Sep. 5, 2017, which is hereby incorporated by reference herein in its entirety.

What is claimed is:

1. An image forming apparatus comprising:
a scanner;
a printer;
a display; and
a controller that determines whether a size of the document set for scanning by the scanner is a predetermined size which is smaller than a standard size,
wherein the display changes, in accordance with determination by the controller that the size of the set document is the predetermined size which is smaller than the standard size, in a state that a copy screen is displayed, the copy screen to a predetermined screen for an ID card mode in which a first surface of the document is scanned by the scanner, and a second surface of the document is scanned by the scanner, and then an image of the first surface and an image of the second surface are printed on the same surface of one sheet by the printer.

2. The image forming apparatus according to claim 1, wherein, in the ID card mode in which a second surface of the document is scanned by the scanner based on a user instruction after the first surface of the document is scanned by the scanner, and then an image of the first surface and an image of the second surface are printed on the same surface of one sheet by the printer based on another user instruction.

3. The image forming apparatus according to claim 1,
wherein in the ID card mode, after the first surface of the document is scanned by the scanner and before the second surface of the document is scanned by the scanner, a message for prompting a user to set the document for reading of the second surface of the ID card is displayed by the display.

4. The image forming apparatus according to claim 1, further comprising:
a document table; and
a sensor that detects the document set on the document table,
wherein the controller determines, in accordance with the document being detected by the sensor, whether the size of document set for scanning by the scanner is the predetermined size which is smaller than the standard size.

5. The image forming apparatus according to claim 1, further comprising:
a document table; and
a sensor that detects that the document is set on the document table;
wherein the controller determines, in accordance with detection by the sensor that the document is detected, whether the size of document set for scanning by the scanner is the predetermined size which is smaller than the standard size.

6. A display control method for an image forming apparatus including a scanner, a printer, and a display, the display control method comprising:

determining whether a size of document set for scanning by the scanner is a predetermined size which is smaller than a standard size, wherein the display changes, in accordance with determination by the controller that the size of the set document is the predetermined size which is smaller than the standard size, in a state that a copy screen is displayed, the copy screen to a predetermined screen for an ID card mode in which a first surface of the document is scanned by the scanner, and a second surface of the document is scanned by the scanner, and then an image of the first surface and an image of the second surface are printed on the same surface of one sheet by the printer.

7. A non-transitory computer-readable storage medium storing a program causing a computer to execute a display control method for an image forming apparatus including a scanner, a printer, and a display, the display control method comprising:

determining whether a size of document is a predetermined size which is smaller than a standard size, wherein the display changes, in accordance with determination by the controller that the size of the set document is the predetermined size which is smaller than the standard size, in a state that a copy screen is displayed, the copy screen to a predetermined screen for an ID card mode in which a first surface of the document is scanned by the scanner, and a second surface of the document is scanned by the scanner, and then an image of the first surface and an image of the second surface are printed on the same surface of one sheet by the printer.

* * * * *